United States Patent
Barreto (10) Patent No.: US 8,075,121 B2
(45) Date of Patent: Dec. 13, 2011

(54) FAST-DRYING, SOLVENT-BASED INKJET INK COMPOSITION AND A METHOD AND SYSTEM FOR PRINTING SUCH INKS

(75) Inventor: Marcos A. Barreto, Aguadilla, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/122,328

(22) PCT Filed: Oct. 6, 2008

(86) PCT No.: PCT/US2008/079002
§ 371 (c)(1),
(2), (4) Date: Apr. 1, 2011

(87) PCT Pub. No.: WO2010/042105
PCT Pub. Date: Apr. 15, 2010

(65) Prior Publication Data
US 2011/0199436 A1  Aug. 18, 2011

(51) Int. Cl.
*B41J 2/17* (2006.01)
(52) U.S. Cl. .............. 347/95; 347/41; 347/100
(58) Field of Classification Search .......... 347/40–43, 347/56, 95–96, 20, 100, 101; 106/31.6, 31.13, 106/31.27; 523/160, 161
See application file for complete search history.

(56) References Cited

U.S. PATENT DOCUMENTS

| | | | |
|---|---|---|---|
| 4,975,117 A | 12/1990 | Tabayashi et al. | |
| 5,006,172 A | 4/1991 | Chieng et al. | |
| 5,431,724 A | 7/1995 | Adamic et al. | |
| 5,641,346 A | 6/1997 | Mantell et al. | |
| 5,766,327 A | 6/1998 | Maze | |
| 5,902,390 A * | 5/1999 | Malhotra et al. | 106/31.58 |
| 6,145,979 A | 11/2000 | Caiger et al. | |
| 6,786,955 B2 | 9/2004 | Kabalnov | |
| 7,001,016 B2 | 2/2006 | Baxter et al. | |
| 7,250,078 B2 | 7/2007 | Iijima et al. | |
| 7,304,095 B2 | 12/2007 | Masumi et al. | |
| 2002/0174800 A1 | 11/2002 | Moreland | |
| 2003/0188662 A1 | 10/2003 | Kabalnov | |
| 2007/0225400 A1 | 9/2007 | Schmid et al. | |

FOREIGN PATENT DOCUMENTS

| | | |
|---|---|---|
| JP | 2005350493 | 12/2005 |
| JP | 2007246791 | 9/2007 |

OTHER PUBLICATIONS

International Search Report for Application No. PCT/US2008/079002 dated May 26, 2009 (11 pages).

* cited by examiner

*Primary Examiner* — Juanita D Stephens (57) ABSTRACT

The present disclosure relates to a fast drying solvent-based inkjet ink composition for thermal inkjet printing, the ink composition comprising at least 40 weight percent base solvent, a solvent-compatible colorant, not more than 25 weight percent propellant, a decap controlling additive, and not more than 5 weight percent water. The present disclosure also relates to the method and system for inkjet printing with the above-described ink.

17 Claims, 6 Drawing Sheets

| Vpp \ PW | 0.5 us | 0.75 us | 1.0 us | 1.25 us | 1.50 us | 1.75 us | 2.0 us | 2.25 us | 2.50 us | 3.0 us | 3.25 us | 3.5 us | 4.0 us |
|---|---|---|---|---|---|---|---|---|---|---|---|---|---|
| 8.0 volts |  |  |  |  | ▨ | ■ | ■ | ■ | ■ | ■ | ■ | ■ | ■ |
| 9.0 volts |  |  |  | ■ | ■ | ■ | ■ | ■ | ■ | ■ | ■ | ■ | ■ |
| 10.0 volts |  |  | ■ | ■ | ■ | ■ | ■ | ■ | ■ | ■ | ■ | ■ | ■ |
| 12.0 volts |  | ▨ | ■ | ■ | ■ | ■ | ■ | ■ | ■ | ■ | ■ | ■ | ■ |
| 13.0 volts |  | ▨ | ■ | ■ | ■ | ■ | ■ | ■ | ■ | ■ | ■ | ■ | ■ |

FIG. 8

FIG. 9

FAST-DRYING, SOLVENT-BASED INKJET INK COMPOSITION AND A METHOD AND SYSTEM FOR PRINTING SUCH INKS

BACKGROUND

The present disclosure relates generally to the problem of achieving fast drying of a thermal inkjet ink on various substrates. There is currently a need for inkjet ink that dries quickly on non-porous and semi-porous materials.

Most of the thermal inkjet inks developed to date are designed to offer superior print quality on porous materials, such as paper (swellable and porous media) and cardboard, among others. These inks are fluids based predominantly in water, in combination with other specialty components, which include surfactants, biocides, humectants, and either a pigment or dye colorant or mixtures of both.

The drying mechanism of most water-based inkjet inks can be regarded as penetration driven, especially when applied to porous media. In contrast, the drying mechanism of inkjet inks on non-porous media is predominantly by evaporation of the ink components.

The use of aqueous-based inks for printing on porous, non-porous and semi-porous materials has been evaluated for industrial applications. Such industrial applications require the use of high speed printing and fast drying of the ink to meet the demands stemming from the high throughput required by the industrial situation. These can efficiently remove water from the printed media and consequently decrease the drying time of the ink. However, the heat radiators are expensive due to high energy costs. Furthermore, the heat has a negative impact on the properties of the media.

It has been found that media properties are altered when exposed to high heat conditions. For example, the media can lose its gloss, the paper can turn yellow, and the media can become deformed.

Fast drying ink compositions based on volatile ingredients have been reported using non-thermal inkjet technology. These include such inkjet technologies as piezoelectric inkjet (PIJ) and continuous inkjet (CIJ). Common ingredients found in these ink compositions include ketones (acetone, methylethylketone), esters (ethyl-, butyl-acetate), lower aliphatic chain alcohol (methanol), cyclic ethers (THF) and other highly volatile components used as the main solvent. However, the vast majority of these components has been regulated and has their use limited due to environmental considerations. Such environmental considerations relate to volatile organic compounds (VOC) emissions and other environmental awareness initiatives. Furthermore, those skilled in the art recognize that the use of these types of ingredients in combination with thermal inkjet ink may have poor performance issues associated with poor drive bubble formation, decap-affected performance, materials compatibility problems, etc. Thus, inkjet inks compatible with thermal inkjet which are based on fast evaporating components have been unknown.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components.

DETAILED DESCRIPTION

The present inventors have found a need for a thermal inkjet ink that meets the demands of the industrial segment. Specifically, this ink should work well in high speed printing, have good print quality, and be fast drying without the need for using heat radiators.

As such, the present inventors disclose herein a fast drying inkjet ink technology based on a drop-on-demand (DOD) fluid dispenser, such as, in a non-limiting example, a thermal inkjet (TIJ) dispenser or a piezo inkjet (PIJ) dispenser, as opposed to non-drop-on-demand systems such as continuous inkjet (CIJ). Such drop on demand systems dispense inks having formulations including organic solvents and only a negligible amount of water. The water content in the presently described ink is absorbed by the solvent during bottling or storage and is considered not to exceed 5% by weight. The ink composition disclosed herein is substantially composed of a base solvent, a propellant, a decap additive, a surfactant, and a solvent-compatible colorant. A polymeric binder resin can also be included.

The term "decap control," as referred to herein, means the ability of the inkjet ink to readily eject from the print head, upon prolonged exposure to air. The ink decap time is measured as the amount of time that an inkjet printhead may be left uncapped before the printer nozzles no longer fire properly, potentially because of clogging or plugging. Generally, nozzle(s) may become clogged (i.e. impeded, slowed) or plugged (i.e. obstructed, substantially or completely closed) by a viscous plug that forms in the nozzle(s) as a result of water loss, crusting of the ink, and/or crystallization of the dye in and/or around any of the nozzles. If a nozzle has become clogged, ink droplets ejected through the nozzle's orifice may be misdirected, which may adversely affect print quality. When an orifice is plugged, it becomes substantially or completely blocked. As a result of the nozzle being plugged, the ink droplets may not pass through the affected nozzle. Thus, the criteria for measuring failure to fire by a nozzle is that there is a misdirection of ink through the nozzle's orifice to a lesser or greater degree, or a complete blockage, which can be precisely indicated in a printed image on media printed by the nozzle. The clogging and plugging effect on nozzles and their ink printing performance can be tested by various methods. In its simplest form, one method involves printing a given test pattern with the printhead nozzles to verify their working condition. This is followed by exposing the nozzles to the air for a fixed time without printing or spitting the nozzles. Then, all of the nozzles are printed again in the given test pattern for the second time. The test patterns are then compared to determine the number of weak or misdirected nozzles. The specific effects of nozzle clogging and plugging with a particular ink and under particular conditions was tested according to the above procedures as described in Example 4. In the worst case, such nozzle clogging or plugging results in a complete failure to fire by the nozzle.

Suitable base solvents for use with the presently disclosed ink composition include, but are not limited to, ethanol, n-propanol, 2-propanol, 1-butanol, etc. The selection of the base solvents was conducted by evaluating the following thermo-physical properties: heat of vaporization (delta $H_{vap}$), boiling point and vapor pressure. Components with a heat of vaporization and boiling temperature closer to the value of water (40.65 kJoules/mole) were found to jet properly from a thermal inkjet printhead. Generally solvents having a heat of vaporization between 30 and 52 kJoules/mole had appropriate jetting qualities from a thermal inkjet printhead. It was found in the case of some components that they did not offer adequate jettability taken alone.

However, when a propellant with both low heat of vaporization and low boiling point was added to the solvent, this adjusted the thermophysical properties of the solvent. Non-limiting examples of such propellants include the following taken either individually or in combination: acetone, methyl ethyl ketone, ethyl acetate, or butyl acetate, The resultant mixture of base solvent and propellant became jettable with thermal inkjet.

Such propellants as linear esters (ethyl-, butyl-acetates), and ketones (e.g., acetone and methyl ethyl ketone), given as non-limiting examples above, have been found to interact with the thermal inkjet printhead materials of a limited number of some older model inkjet printers. Since such interaction and breakdown only occur for such printers when the propellants are used in the ink in proportions exceeding 40 weight %, such propellants are used in the ink at no more than 25 weight %. Therefore, such incompatibility problems no longer occur in any of the inkjet printhead materials tested when the ink has no more than 25 weight % propellant. In addition to the propellants, the ink also has a base solvent. The base solvent is usually present in the ink at a concentration of at least 40 weight %. Lower aliphatic chain alcohols such as ethanol, 2-propanol, n-propanol and 1-butanol showed optimum jettability performance in the present fast drying inkjet inks. They were thus selected, among others, as possible base solvents for the inks. When propellants were present at a percentage weight of between 15 and 25 weight % along with base solvents, the ink showed good effectiveness in drop on demand printing.

Additives to control decap were selected from components having a low to moderate vapor pressure (1-5 mm Hg at 25° C.) and a boiling point larger than the base solvent. Non-limiting examples of good decap-controlling additives include (among others): 1-methoxy-2-propanol, ethyl lactate, tert-butanol, tert-butyl acetate and 1-butanol. A low to moderate vapor pressure ensures that the decap-controlling additives are quickly removed from the printed ink, while maintaining a wet environment in the firing chamber area.

Fast removal by evaporation of the non-colorant ink components from the printed ink ensures that drop coalescence is minimized. Thus, a more uniform ink coverage is obtained particularly for low surface energy substrates (25 mN/m² or less). If the base solvents/additive system is not removed quickly, the resultant printed image will show poor print quality due to a poor area fill. Surfactants are added to the ink formulations to improve wetting properties and to control surface tension gradients that result from the evaporation of the organic solvents. As surfactants, silicones (such as, for example, Silwet L7200, Silwet L7220 and Dow Corning 67), fluorosurfactants (such as, for example, Novec FC4430, Novec FC4432, Zonyl FSO) and dodecylbenzyl sulfonic acid (DBSA) have been found to be compatible with organic systems such as those described for the presently disclosed inkjet inks.

A polymeric resin may also be added to the ink formulation to improve durability of the printed ink.

Suitable colorants compatible with the organic systems include solvent dyes, which were obtained in their solid (powder) form or dissolved in an organic solvent such as n-propanol or a glycol ether mixture. N-propanol liquid dyes are the preferred solutions for the presently disclosed ink. Commercially available dyes sold in the liquid form in n-propanol base include Morfast K 101 and Morfast K DC manufactured by Sunbelt Corporation.

The above-described ink components in the presently disclosed ink compositions offered a drying time of less than 5 seconds in non-absorbent media, such as polypropylene packaging tape, as well as varnished and overcoated substrates (e.g., UV gloss, Aqueous Ni Coat Hi gloss, and others), and as well as other polymeric films such as polystyrene (PS), polyethylene terephthalate (PET), polypropylene (PP), and others.

In addition, solvent removal of the printed ink was accelerated by means of in-line air drying, for example, by using axial cooling fans positioned in the high speed printer immediately following the printing engine. The inclusion of the in-line air drying systems can allow the best inks to be used. The drying tunnel can provide optimum conditions for evaporation of ink components. The drying systems can also maximize positive results with effects related to decap, recovery and coalescence control.

In summary, the presently described inks reflect the combination of current thermal inkjet technology with organic based ink compositions composed of fast evaporating components. These ink compositions offer consistent pen performance and bring long-term compatibility with thermal inkjet printhead materials. The presently described ink compositions provide fast drying (e.g., less than 5 seconds) on non-absorbent substrates. They also offer good print quality and adequate decap control performance and long term inkjet printhead recovery. Additionally, the inclusion of the solvent dyes brings the advantage of improved waterfastness due to the low solubility in water of the dyes. The incorporation of in-line air drying via axial cooling fans was shown to accelerate solvent removal and decrease drying time.

Figure 1:
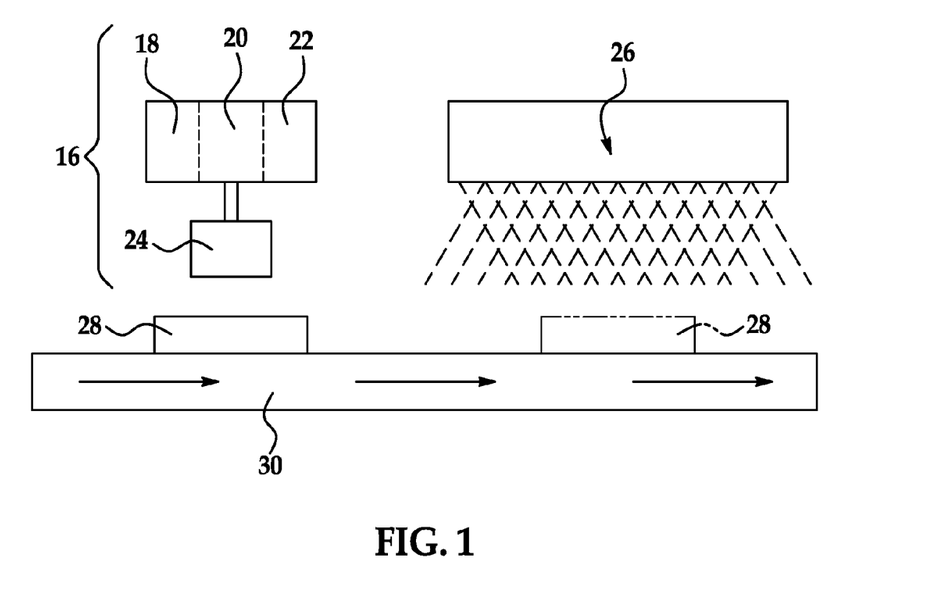
FIG. 1 is a schematic drawing of an embodiment of the printer/dryer system described herein.

FIG. 1 depicts an inkjet fluid dispensing device, as well as an air dryer for causing fast evaporation of the printed ink on the medium. The inkjet fluid dispensing devices used for the present disclosure can be thermal inkjet (TIJ) or piezoelectric inkjet (PIJ) devices. These include at least one fluid reservoir 18. By way of example only, multiple reservoirs 20 and 22 can also be provided in the fluid dispenser 16. Each reservoir 18, 20, 22 may contain the same or different fluids. Alternatively, a single reservoir can contain a plurality of separate compartments. Such fluid dispenser 16 includes at least one fluid drop generator or inkjet printhead for each reservoir 18, 20 and 22. Preferably, an array 24 is provided with a plurality of heads or droplet generators divided into subgroups, with each subgroup containing a plurality of heads associated with one specific reservoir 18, 20 or 22. The fluid dispenser 16 is a drop on demand type fluid dispenser with a thermal fluid drop.

Also depicted along with the fluid dispenser 16 in FIG. 1 is a drying tunnel 26 by which the liquid in the ink printed by the fluid dispenser 16 is quickly evaporated off of the printed medium 28. The printed medium 28 moves through the drying tunnel 26 by means of a conveyor 30. As shown in FIG. 1, the drying tunnel 26 extends along the conveyor 30 from the fluid dispenser 16. After passing through the tunnel 26, the liquid in the ink printed onto the medium 28 is substantially or completely evaporated. In a non-limiting example, the drying tunnel 26 keeps the medium at approximately ambient or room temperature. In another non-limiting example, the evaporation of the liquid in the printed ink can be facilitated with fans (not shown) positioned along the drying tunnel 26. In another non-limiting example, the drying tunnel 26 extends from approximately 20 to 40 inches in length from where the medium 28 enters the tunnel 26 to where it exits the tunnel 26.

To further illustrate embodiment(s) of the present disclosure, examples are given herein. It is to be understood that these examples are provided for illustrative purposes and are not to be construed as limiting the scope of the disclosed embodiment(s).

EXAMPLES

Example 1

Base solvents were tested for jettability by using energy maps. The energy map is a graph of pulse width vs. applied voltage of a printhead. The energy map can be used to measure TOE (turn on energy). At the same time, it provides additional information regarding drop trajectory, and other issues such as spray and satellites. Good jettability can be associated with the production of uniform, dense blocks along the energy map matrix The printer used to obtain these data included a 24 inch air-drying tunnel to ensure optimum conditions for the evaporation of the ink components.

Figure 2:
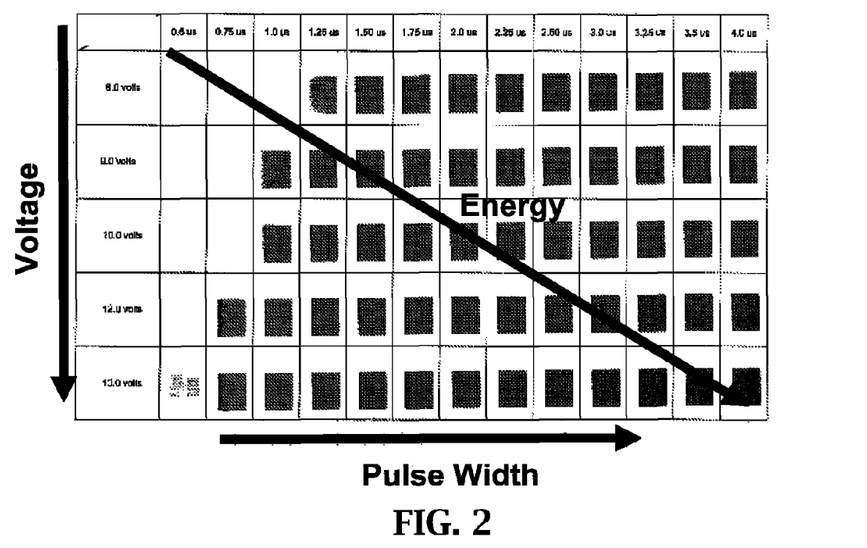
FIG. 2 is an energy map based on data described herein.

In FIG. 2, ethanol was selected as the solvent to achieve optimum vehicle jettability in the system. It thus served as a control to compare to other solvents tested. FIG. 2 shows an energy map which resulted when a solution of 97% w/w of ethanol and 3% of the Morfast K DC liquid black dye was measured. The ethanol solution showed good jettability. The resulting optimized energy map had substantially uniform, dense blocks along the energy map matrix with a minimum of 1.50 μs pulse width at 8.0 volts and a minimum 0.75 μs pulse at 15.0 volts.

Figure 3:
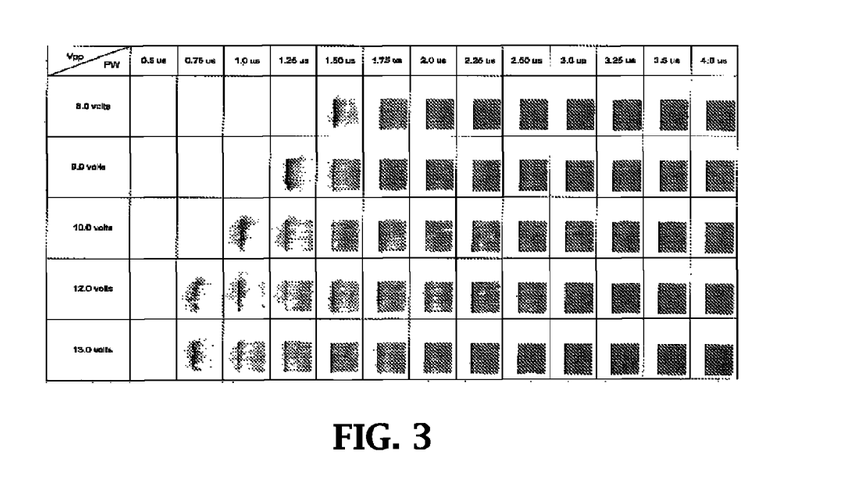
FIG. 3 is a further energy map based on data described herein.

FIG. 3 shows energy map results when a solution of 97% w/w of n-propanol and 3% w/w of the Morfast K DC liquid black dye was measured for vehicle jettability. The energy map of n-propanol solution showed marginal jettability in comparison to the energy map of ethanol in FIG. 2.

Figure 4:
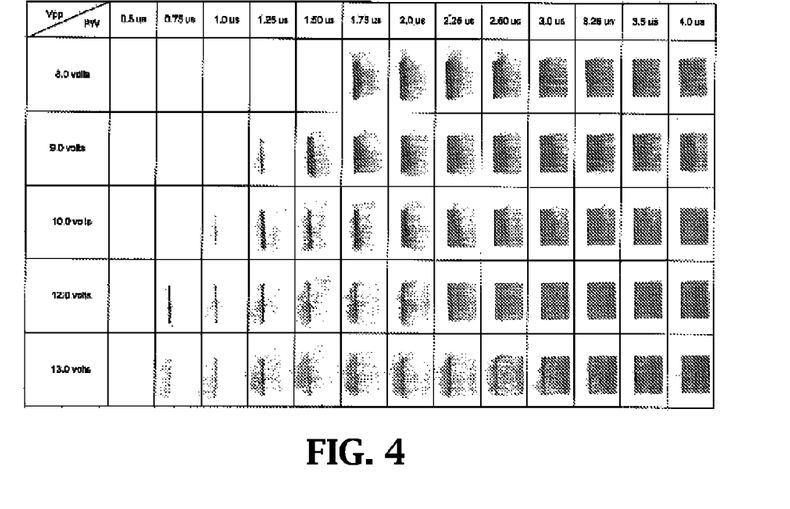
FIG. 4 is a still further energy map based on data described herein.

FIG. 4 shows energy map results when a solution of 97% w/w of 1-butanol and 3% w/w of the Morfast K DC liquid black dye was measured for vehicle jettability. The energy map of 1-butanol solution showed poor jettability in comparison to the energy map of ethanol in FIG. 2.

Example 2

Figure 5:
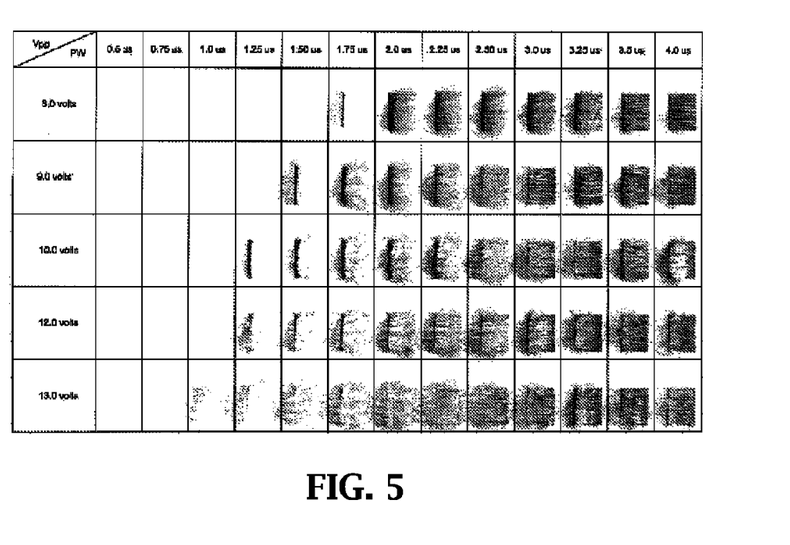
FIG. 5 is yet a further energy map based on data described herein.

Using the same printing system as Example 1, other ink mixtures were tested. FIG. 5 shows energy map results when a mixture of 1-butanol (78% w/w)), 1-hexanol (16% w/w) and black dye (5.4% w/w of the Morfast K DC liquid black dye) was measured for vehicle jettability. This solution showed poor jettability. This mixture represented the control ink without a propellant.

Figure 6:
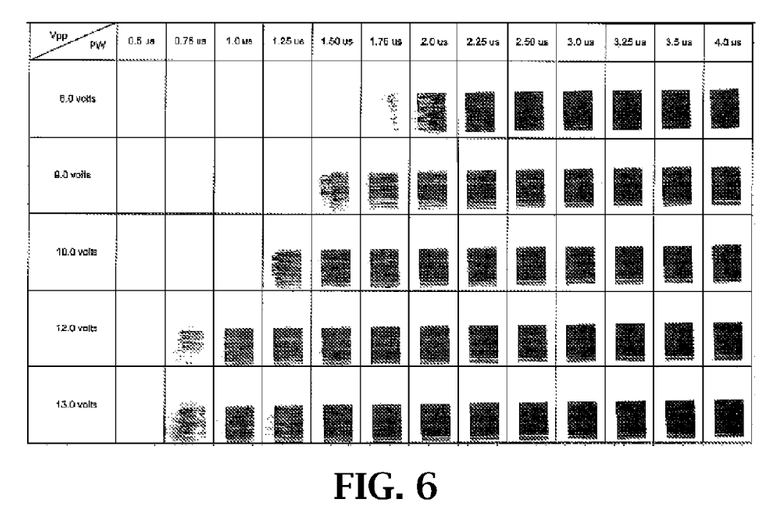
FIG. 6 is still another energy map based on data described herein.

FIG. 6 shows energy map results when a mixture of 1-butanol (73% w/w), acetone (16% w/w), 1-hexanol (5.4% w/w) and 5.4% w/w of the Morfast K DC liquid black dye was measured for vehicle jettability. This solution showed good jettability. This mixture represented ink with acetone as a propellant (16% w/w).

Figure 7:
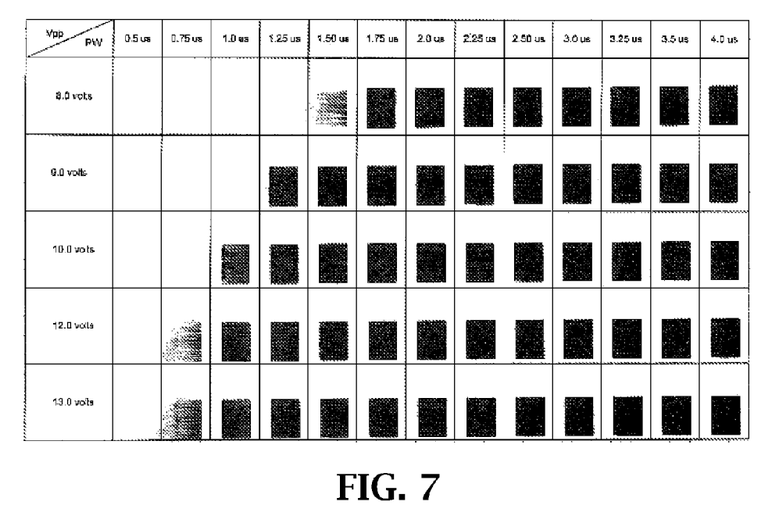
FIG. 7 is yet another energy map based on data described herein.

FIG. 7 shows energy map results when a mixture of 1-butanol (62% w/w), acetone (21.6% w/w), 1-hexanol (5.4% w/w) and 5.4% w/w of the Morfast K DC liquid black dye was measured for vehicle jettability. This solution showed good jettability. This mixture represented ink with acetone as a propellant in a larger proportion (22% w/w).

Figure 8:
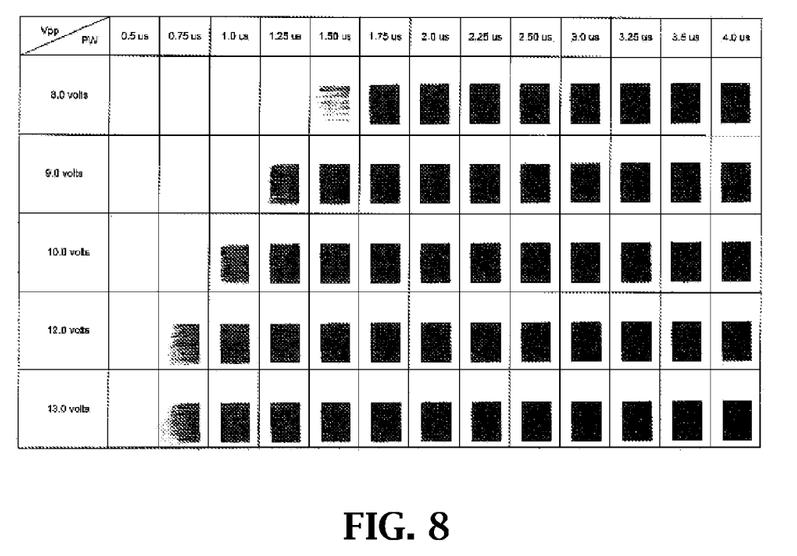
FIG. 8 is another energy map based on data described herein.

FIG. 8 shows energy map results when a mixture of 1-butanol (62% w/w), acetone (27% w/w), 1-hexanol (5.4% w/w) and 5.4% w/w of the Morfast K DC liquid black dye was measured for vehicle jettability. This solution showed good jettability. This mixture represented ink with acetone as a propellant in a yet larger proportion (27% w/w).

Example 3

Five different fast-drying ink compositions were prepared. The compositions of Inks #1, #2, #3, #4, and #5 are given below in Tables 1 through 5 respectively.

TABLE 1

| Ink #1 | % w/w |
| --- | --- |
| n-propanol | 73.91 |
| Acetone | 16.30 |
| Joncryl ® 683 | 1.09 |
| Solvent Violet 9 | 0.22 |
| Solvent Brown 52 | 2.58 |
| Dodecylbenzene Sulfonic Acid (DBSA) | 0.46 |
| 1-Hexanol | 5.43 |

TABLE 2

| Ink #2 | % w/w |
| --- | --- |
| 1-butanol | 72.97 |
| Propylene glycol | 2.70 |
| Acetone | 16.22 |
| 1-propanol | 2.43 |
| Solvent Yellow 161 | 2.03 |
| Solvent Red 49 | 2.03 |
| 2-Ethylhexanoic acid | 1.62 |

TABLE 3

| Ink #3 | % w/w |
| --- | --- |
| 2-propanol | 77.03 |
| Acetone | 8.11 |
| tert-butyl acetate | 5.41 |
| n-propanol | 3.81 |
| Solvent Violet 9 | 0.38 |
| Solvent Brown 52 | 4.47 |
| Dodecylbenzene Sulfonic Acid (DBSA) | 0.79 |

TABLE 4

| Ink #4 | % w/w |
| --- | --- |
| Ethanol | 77.03 |
| Acetone | 8.11 |
| 1-butanol | 5.41 |
| n-propanol | 3.81 |
| Solvent Violet 9 | 0.38 |
| Solvent Brown 52 | 4.47 |
| Dodecylbenzene Sulfonic Acid (DBSA) | 0.79 |

TABLE 5

| Ink #5 | % w/w |
| --- | --- |
| Ethanol | 76.92 |
| Acetone | 8.11 |
| 1-butanol | 5.41 |
| n-propanol | 3.81 |
| Solvent Violet 9 | 0.38 |
| Solvent Brown 52 | 4.47 |
| Dodecylbenzene Sulfonic Acid (DBSA) | 0.79 |
| Novec FC-4430 | 0.11 |

Example 4

The decap of Ink #3 and Ink #4 (formulations given above in Example 3) were measured to determine the time at which the first printer nozzle becomes weak or misdirected. First, the printhead was wiped off and all the nozzles were printed in a test pattern to verify that they were in working condition. The printhead was exposed to the air for a fixed time without printing or spitting. Then, all the nozzles were printed in a second test pattern. The test patterns before and after slewing were compared to determine the number of weak or misdirected nozzles after the given amount of time. The process was repeated with incrementally increasing time intervals. Inks with longer decap times can be left unused for longer periods of time without plugging the printer nozzles.

Figure 9:
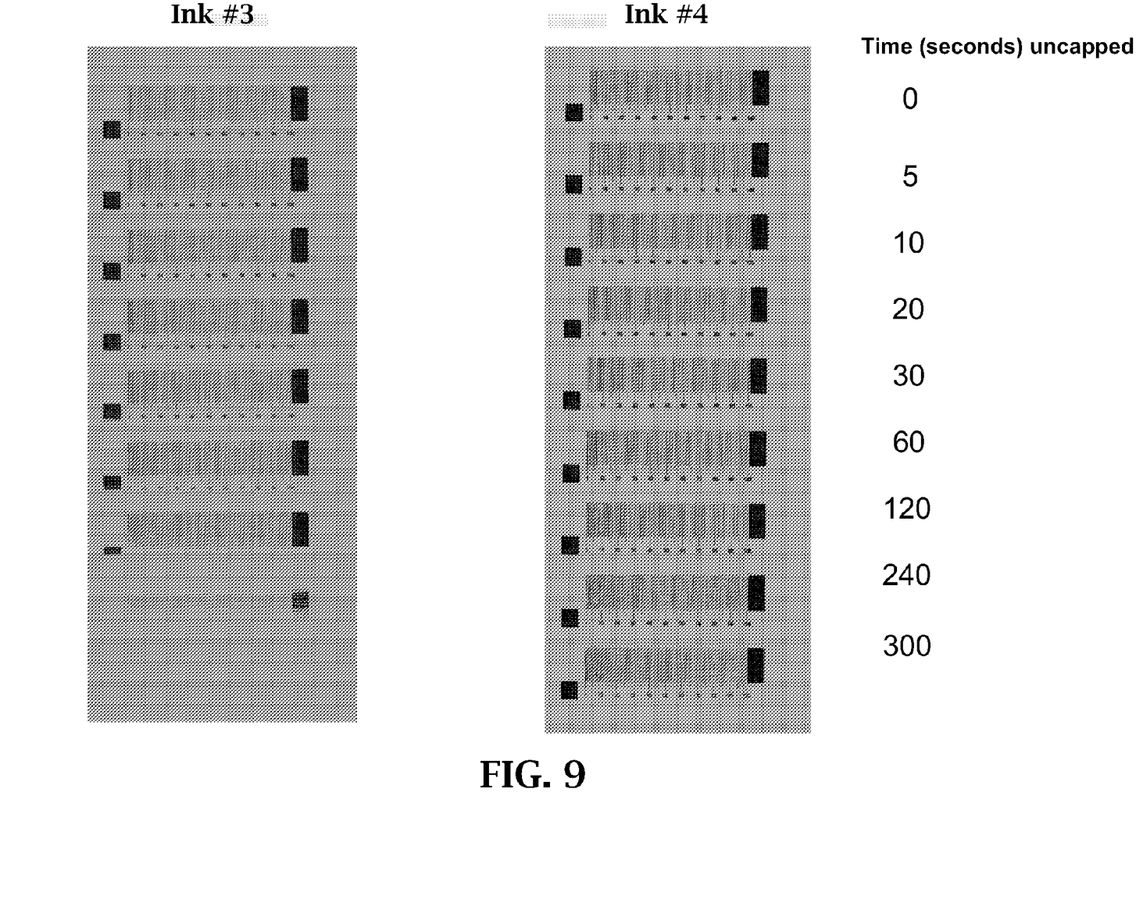
FIG. 9 shows nozzle test results printed under conditions, and based on data described herein.

The results of this test are shown in FIG. 9. Both Inks #3 and #4 were left uncapped for the following time intervals: 0 seconds, 5 seconds, 10 seconds, 20 seconds, 30 seconds, 60 seconds, 120 seconds, and 240 seconds. Each ink was used to print a 100 consecutive line test pattern at each of the above time intervals. Ink #3 began to show negative decap effects (visual shortening and fading of the 100 lines in the tests pattern) after the ink had been uncapped for 120 seconds. Ink # 4 still performed well and showed no significant effects after the ink had been uncapped for 240 seconds and beyond and was able to print the test pattern at an interval of 300 seconds.

While several embodiments have been described in detail, it will be apparent to those skilled in the art that the disclosed embodiments may be modified. Therefore, the foregoing description is to be considered exemplary rather than limiting.

What is claimed is:

1. A fast drying solvent-based inkjet ink composition for inkjet printing, the ink composition comprising at least 40 weight percent base solvent, a solvent-compatible colorant, propellant, a decap-controlling additive, and not more than 5 weight percent water;
wherein the propellant is compatible with inkjet printhead materials at 25 weight percent or less.

2. The ink composition of claim 1, wherein the ink composition is for thermal inkjet printing.

3. The ink composition of claim 1, wherein the base solvent and propellant have a heat of vaporization from 30 to 52 kJoules/mole.

4. The ink composition of claim 1, wherein the base solvent is selected from the group consisting of ethanol, n-propanol, 2-propanol, 1-butanol and combinations thereof.

5. The ink composition of claim 1, wherein the propellant is selected from the group consisting of acetone, methyl ethyl ketone, ethyl acetate, butyl acetate and combinations thereof and wherein the propellant is 25 weight % or less of the ink composition.

6. The ink composition of claim 1, wherein the decap-controlling additive has a vapor pressure from 1 to 5 mm Hg at 25° C. and has a boiling point greater than the base solvent.

7. The ink composition of claim 1, wherein the decap-controlling additive is selected from the group consisting of 1-methoxy-2-propanol, ethyl lactate, tert-butanol, tert-butyl acetate, 1-butanol and combinations thereof.

8. The ink composition of claim 1, wherein the ink composition further comprises a surfactant compatible with organic systems.

9. The ink composition of claim 8, wherein the surfactant is selected from the group consisting of silicones and fluorosurfactants.

10. The ink composition of claim 1, wherein the colorants are solvent dyes.

11. The ink composition of claim 1, wherein the dry time when the ink composition is printed on a non-absorbent substrate is less than 5 seconds.

12. A method of printing a fast-drying solvent-based inkjet ink with an ink composition comprising at least 40 weight percent base solvent, a solvent-compatible colorant, at most 25 weight percent propellant, a decap-controlling additive, and not more than 5 weight percent water; the method comprising the step of activating an inkjet printhead to eject the inkjet ink.

13. The method of claim 12, further comprising establishing fluid communication between the inkjet printhead and an ink supply container through a fluid conduit.

14. The method of claim 12, further comprising an ink reservoir integrally formed in an inkjet cartridge, the ink reservoir in fluid communication with the inkjet printhead.

15. A system for inkjet printing, and fast drying of an image on non-absorbent media, the system comprising:
at least one drop on demand inkjet printhead having a fluid ejector configured for dropwise ejecting ink drops onto a non-absorbant media, the printhead fluidically coupled with an ink source, wherein the ink source includes:
an ink composition comprising at least 40 weight percent base solvent, a solvent-compatible colorant, at most 25 weight percent propellant, a decap additive, and not more than 5 weight percent water; and
a drying system attached to the system for inkjet printing.

16. The system of claim 15, wherein the base solvent and propellant have a heat of vaporization from 30 to 52 kJoules/mole.

17. The system of claim 15, wherein the base solvent and propellant is selected from the group consisting of ethanol, n-propanol, 2-propanol, 1-butanol, acetone, methyl ethyl ketone, ethyl acetate, butyl acetate and combinations thereof.

* * * * *

UNITED STATES PATENT AND TRADEMARK OFFICE
CERTIFICATE OF CORRECTION

| | |
|---|---|
| PATENT NO. | : 8,075,121 B2 |
| APPLICATION NO. | : 13/122328 |
| DATED | : December 13, 2011 |
| INVENTOR(S) | : Marcos A. Barreto |

It is certified that error appears in the above-identified patent and that said Letters Patent is hereby corrected as shown below:

In column 8, line 43, in Claim 15, delete "non-absorbant" and insert -- non-absorbent --, therefor.

Signed and Sealed this
Twentieth Day of November, 2012

David J. Kappos
*Director of the United States Patent and Trademark Office*